United States Patent
Van Esch et al.

(10) Patent No.: US 9,109,050 B2
(45) Date of Patent: Aug. 18, 2015

(54) PROCESS USING HYDROCYCLONES

(75) Inventors: Franciscus Adrianus Josephus Van Esch, Hulst (NL); Paul Joseph Van Hove, Graauw (NL)

(73) Assignee: CARGILL, INCORPORATED, Wayzata, MN (US)

( * ) Notice: Subject to any disclaimer, the term of this patent is extended or adjusted under 35 U.S.C. 154(b) by 75 days.

(21) Appl. No.: 13/139,209

(22) PCT Filed: Dec. 2, 2009

(86) PCT No.: PCT/EP2009/008580
§ 371 (c)(1),
(2), (4) Date: Jun. 10, 2011

(87) PCT Pub. No.: WO2010/066368
PCT Pub. Date: Jun. 17, 2010

(65) Prior Publication Data
US 2011/0240010 A1    Oct. 6, 2011

(30) Foreign Application Priority Data
Dec. 10, 2008  (EP) .................................... 08021433

(51) Int. Cl.
*C08B 30/00* (2006.01)
*C08B 31/00* (2006.01)
*C08B 31/12* (2006.01)

(52) U.S. Cl.
CPC ................. *C08B 31/00* (2013.01); *C08B 31/12* (2013.01)

(58) Field of Classification Search
None
See application file for complete search history.

(56) References Cited

U.S. PATENT DOCUMENTS

| | | | | |
|---|---|---|---|---|
| 3,890,888 A | * | 6/1975 | Verberne | 99/483 |
| 4,283,232 A | * | 8/1981 | Best | 127/71 |
| 5,300,150 A | * | 4/1994 | Fuertes et al. | 127/70 |

FOREIGN PATENT DOCUMENTS

| | | |
|---|---|---|
| EP | 0005651 A | 11/1979 |
| EP | 0466577 A | 1/1992 |
| GB | 815358 A | 6/1959 |
| GB | 2011451 A | 7/1979 |
| WO | WO 2010/066368 | 6/2010 |

OTHER PUBLICATIONS

PCT International Search Report PCT/EP2009/008580. Mailed Feb. 22, 2010. 5 pages.

* cited by examiner

*Primary Examiner* — Melvin C Mayes
*Assistant Examiner* — Colette Nguyen

(57) ABSTRACT

The present invention concerns a process for preparing of slurries containing suspended and dissolved particles and a solution as well as a slurry are provided onto a hydrocyclone equipment, disk centrifuge or nozzle centrifuge equipment. The dry matter concentration in the collected slurry is higher than the concentration of the mixture of the slurry and the solution as such. The use of a hydrocyclone stage for this specific purpose is disclosed as well.

17 Claims, 3 Drawing Sheets

PROCESS USING HYDROCYCLONES

This application claims the benefit of the international application PCT/EP2009/008580, filed 2 Dec. 2009, which application claims priority to European application 08021433.1, filed 10 Dec. 2008, which applications are hereby incorporated by reference herein in their entirety.

BACKGROUND OF THE INVENTION

In industry and in many applications it is needed to combine streams, solutions, slurries together either to use them as a combined reaction medium or as a finished product. Usually one is confronted with a dilution effect or one has to apply drying methods, which can be ineffective, and/or expensive.

It is know to employ hydrocyclones in the treatment of particular feedstock for the purpose of removing impurities or relatively low grade substances, such as contaminants. Such contaminants may for example be present in solution in a liquid medium in which the particulate feedstock is suspended, and/or they may be present as undissolved solid particles.

According to one commonly used procedure, use is made of a plurality of hydrocyclone stages arranged in series or cascade for performing a continuous countercurrent washing process. The particulate feedstock together with the liquid medium, which contains dissolved contaminants, is fed into the first hydrocyclone stage and fresh liquid is continuously fed into the last stage. U.S. Pat. No. 4,283,232 discuss such a typical set-up of hydrocyclones.

In industry, many reactions are carried out using a heterogeneous mixture of substances such as a suspension of solid or undissolved substances, which are finely distributed in a reaction liquid. Such suspensions are often referred to as slurries or reaction slurries. In these slurries, the reaction liquid does not solubilize the undissolved substances or it solubilizes only a part of these substances so that the remaining part is not dissolved. Frequently some of the reactants, products and/or reaction components that are not converted during the reaction, such as catalysts or other reaction aids which provide a suitable reaction environment and/or promote the reaction are dissolved in the reaction medium, while others are suspended but not or not fully solubilized.

Hydrocyclones are typically used in the treatment of heterogeneous mixtures and examples are for instance in pulp and paper mills to remove sand, staples, plastic particles and other contaminants, in the drilling industry to separate sand from the expensive clay that is used for lubrication during the drilling, in industry to separate oil from water or vice versa, and in metal working to separate metal particles from cooling liquid.

U.S. Pat. No. 3,890,888 also describes a hydrocyclone-based apparatus for the recovery of non-diluted or little diluted juice and of starch from root crops.

GB 2 011 451 describes a process and apparatus for the production of modified starches wherein a starch slurry is centrifuged and the resulting cake is then diluted and submitted to chemical modification, modified starch slurry is then centrifuged and the filtrate is recycled back to the dilution tank whereby it is used to dilute reactants thus avoiding elimination of waste waters.

Hence, there is still a need in the art for a process of effectively utilizing hydrocyclones, disk, or nozzle centrifuges for preparing a slurry.

SUMMARY OF THE INVENTION

The current invention relates to a process for preparation of slurries containing suspended and dissolved particles and said process is comprising the following steps:
  a. Taking a solution (A) of dissolved particles (A'),
  b. Taking a slurry (B) of suspended particles (B'),
  c. Providing solution (A) and slurry (B) onto a hydrocyclone equipment, disk centrifuge equipment and/or nozzle centrifuge equipment, preferably a hydrocyclone equipment,
  d. Collecting slurry (B") containing at least a part of dissolved particles (A').

The process is characterized in that the collected slurry (B") has a total dry matter concentration of the suspended particles (B') and dissolved particles (A') that is higher than the combined dry matter concentration of solution (A) and slurry (B).

The current invention further relates to the use of a hydrocyclone stage or hydrocyclone battery for combining the dry matter of two streams into a single stream having a total dry matter concentration that is higher than the dry matter concentration of the combined streams.

SHORT DESCRIPTION OF THE FIGURES

DETAILED DESCRIPTION OF THE INVENTION

Figure 1:
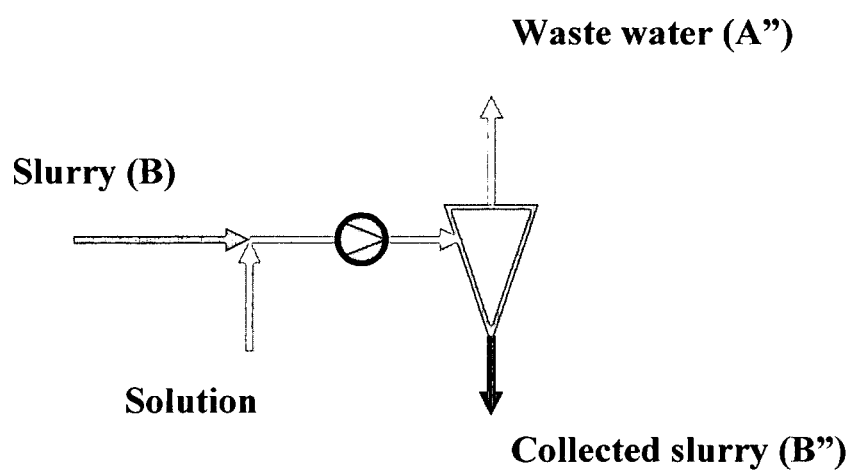
FIG. 1 represents a flow sheet of an example for a hydrocyclone equipment comprising one stage according to the present invention.

The current invention relates to a process for preparation of slurries containing suspended and dissolved particles and said process is comprising the following steps:
  a. Taking a solution (A) of dissolved particles (A'),
  b. Taking a slurry (B) of suspended particles (B'),
  c. Providing solution (A) and slurry (B) onto a hydrocyclone equipment, disk centrifuge equipment and/or nozzle centrifuge equipment, preferably a hydrocyclone equipment,
  d. Collecting slurry (B") containing at least a part of dissolved particles (A').

A solution is a homogeneous mixture composed of two or more substances. In such a mixture, a solute is dissolved in another substance, known as a solvent. All solutions are characterized by interactions between the solvent phase and solute molecules or ions that result in a net decrease in free energy.

Dissolved particles are obtained through dissolution, or solvation of a solid substance into a solvent to yield a solution. However solutions are not limited to the actively dissolved particles in a liquid. Some solutions can exist as such, for instance seawater. The current invention is not limited to any type of solution and/or dissolved particles.

The dissolved particles (A') of the present invention also refer to particles being present in colloids, in which the particles are small and do not settle.

A colloid is a type of mechanical mixture where one substance is dispersed evenly throughout another. Because of this dispersal, some colloids have the appearance of solution, however a colloidal system consists of two separate phases: a dispersed phase (or internal phase) and a continuous phase (or dispersion medium). Common examples of colloids are milk, mayonnaise, pigmented ink, and the like.

A slurry is, in general, a suspension of solids in a liquid. E.g. a slurry may be a mixture of water and cement, a mixture of water and thickening agent, a mixture of wood pulp and water used to make paper, a mixture of water and animal waste used as fertilizer, an abrasive substance used in chemical-mechanical polishing, a mixture of ice water and freezing point depressant, a mixture of water and ceramic powder and various additives (e.g., dispersant) used in the processing of ceramics, a mixture of water and a starch or starch derivative, and the like.

Suspensed particles (B') are present in a suspension, which is a heterogenous fluid containing solid particles that are sufficiently large for sedimentation. The internal phase (solid) is suspended throughout the external phase (fluid) through mechanical agitation, eventually with the use of certain excipients or suspending agents. Unlike colloids, suspensions will eventually settle. The suspended particles are visible under a microscope and will settle over time if left undisturbed. Suspensions are classified on the basis of the dispersed phase and the dispersion medium, where the former is essentially solid while the latter may either be a solid, a liquid or a gas. Common examples of a suspension with suspended particles (B') are mud or muddy water where soil, clay, or silt particles are suspended in water, or flour suspended in water, paint, chalk powder suspended in water, dust particles suspended in air, algae in water, sand in water, and the like.

A hydrocyclone is a device to classify/separate or sort particles in a liquid suspension based on the densities of the particles. A hydrocyclone will normally have a cylindrical section at the top where liquid is being fed tangential and a geometry base. The angle, and hence length of the conical section, plays a role in determining operating characteristics.

A hydrocyclone has two exits on the axis: the smaller on the bottom (underflow) and a larger at the top (overflow). The underflow is generally the denser or thicker fraction, while the overflow is the lighter or more fluid fraction.

Internally, centrifugal force is countered by the resistance of the liquid, with the effect that larger or denser particles are transported to the wall for eventual exit with a limited amount of liquid, whilst the lighter liquid exit at the overflow side through a tube extending slightly into the body of the cyclone at the center.

Hydrocyclones can be made of metal (mostly steel), ceramic, plastic such as polyurethane, polypropylene or other types. Metal or ceramic hydrocyclones are used for situations requiring more strength, or durability in terms of heat or pressure. When there is an occurrence of much wear such as occurs with sand particles polyurethane performs better than metals or ceramics. Metal lined with polyurethane is used in cases of combined abrasion and high pressure. Efficiency of separation is a function of the solids' concentration: the higher the concentration, the lower the efficiency of separation. Further parameters, such as cyclone diameter, exit dimensions, feed pressure and the relative characteristics of the particles and the liquid, can have all or separately an effect on the efficiency of the process.

Several types of hydrocyclones are commercially available, and currently applied trade names are Dorr Oliver, FluidQuip, Alva Laval and Mozley. those sold under the trade name "DorrClone" are preferred. A DorrClone hydrocyclone that can be used in the present invention, comprises three basic members: a vortex member, a conical member and a apex member.

This hydrocyclone is also related to disk or nozzle centrifuges, and both of them are intended to separate heavies and lights in liquid by application of centrifugal force. In a preferred embodiment a hydrocyclone equipment is applied for combining the dry matter of a solution (A) and a slurry (B). A hydrocyclone equipment may be one hydrocyclone stage or may consist of a plurality of hydrocyclone stages. A hydrocyclone stage in itself may consist of one hydrocyclone or a plurality of hydrocyclones. Also the disk and/or nozzle centrifuge equipment may be one centrifuge or may consist of a plurality of centrifuges.

The process is characterized in that the collecting slurry (B") is containing at least a part of dissolved particles (A'). The collected slurry (B") is further containing the majority of the suspended particles (B'). At least 90% by weight of the initial suspended particles (B') is collected in slurry (B"). Preferably at least 92% by weight, more preferably at least 93%, 95%, 96%, 97%, 98%, most preferably at least 99% by weight is collected in slurry (B"). Furthermore a part of the dissolved particles (A') is contained in collected slurry (B"). At least 10% by weight of the initial dissolved particles (A') present in initial solution (A) is recuperated into the collected slurry (B"). Preferably at least 20%, more preferably 30%, more preferably 35%, more preferably 40%, more preferably 45%, more preferably 50%, more preferably 52%, more preferably 53%, more preferably 55%, more preferably 56%, more preferably 58%, more preferably up to 60%, even more preferably up to 65%, 70% or even 80% by weight of initial dissolved particles (A') is recuperated in collected slurry (B").

The process is characterized in that the collected slurry (B") has a total dry matter concentration of the suspended particles (B') and dissolved particles (A') that is higher than the combined dry matter concentration of solution (A) and slurry (B). By simply mixing solution (A) and slurry (B) the total dry matter is combined in the combined volume of solution (A) and (B), which leads to a dilution of the suspended particles (B') as well as the dissolved particles (A'). The present invention provides a process wherein the final dry matter concentration of the collected slurry (B") is higher than the concentration that one would obtain through simply mixing the solution (A) and the slurry (B). In order to have an effective process, the total dry matter concentration (expressed in weight per weight) of the suspended particles (B') and the dissolved particles (A') in slurry (B") is at least 3% based upon initial concentration, preferably at least 5%, more preferably at least 7%, more preferably at least 10%, more preferably 15%, more preferably 20%, more preferably 30%, more preferably 35%, more preferably 38%, more preferably 45%, even up to 50% higher than the dry matter concentration of the combined solution (A) and slurry (B). Slurry (B") is concentrated (=dry matter concentration is increased) in comparison to the combined dry matter concentration when simply mixing solution (A) and slurry (B).

The medium of the solution (A) and the slurry (B) can be selected from any suitable solvent or mixture of solvents. In a preferred embodiment the medium is a liquid comprising water, more preferably an aqueous medium. Preferably the medium of solution (A) and slurry (B) are the same or at least similar.

The present invention further relates to a process wherein the slurry (B) is a slurry of starch, and/or starch derivatives.

The starches can be derived from any native source, wherein native relates to the fact that said starch is found in nature. Unless specifically distinguished, references to starch in this description are meant to include their corresponding flours, which are still containing proteins, such as wheat gluten (hereinafter "starch"). Typical sources for the starches are cereals, tubers, roots, legumes, fruit starches and hybrid starches. Suitable sources include but are not limited to corn, pea, potato, sweet potato, sorghum, banana, barley, wheat, rice, sago, amaranth, tapioca, arrowroot, canna, and low amylose (containing no more than about 10% by weight amylose, preferably no more than 5%) or high amylose (containing at least about 40% by weight amylose) and varieties thereof. Also suitable are starches derived from a plant obtained by breeding techniques including crossbreeding, translocation, inversion, transformation or any other method of gene or chromosome engineering to include variations thereof. In addition, starch derived from a plant grown from artificial mutations and variations of the above generic composition, which may be produced by known standard methods of mutation breeding are also suitable herein. Modifications are intended to include chemical modifications and physical modifications. The chemical modifications are intended to include without limitation crosslinked starches, acetylated starches, hydroxyethylated and hydroxypropylated starches, inorganically esterified starches, cationic, anionic, oxidized starches, zwitterionic starches, starches modified by enzymes, and combinations thereof, provided that the starches are not fully dissolved in the liquid medium and provide a slurry of suspended particles (B'). Physically modified starches such as thermally inhibited starches as disclosed for example in EP Patent No. 1 038 882 may also be suitable for use herein. It is to be understood that mixtures of any of the above mentioned starches and/or flours are also within the scope of this invention. For the sake of simplicity, any reference herein to starch, starch derivative or starch substrate will be understood to include one or several kinds of native starch, and/or starch derivatives.

The current invention further relates to a process wherein the hydrocyclone equipment is just one hydrocyclone stage or alternatively is a battery of hydrocyclone stages containing at least two hydrocyclone stages. Whereas a hydrocyclone stage may contain a plurality of hydrocyclones, a battery of hydrocyclone stages is containing more than one stage, such as two hydrocyclone stages, three hydrocyclone stages, four hydrocyclone stages, five hydrocyclone stages, six hydrocyclone stages, seven hydrocyclone stages, eight hydrocyclone stages, nine hydrocyclone stages, ten hydrocyclone stages, or more than ten stages, such as eleven or twelve or even more.

In a preferred embodiment a battery of 9 hydrocyclone stages is applied.

By applying a battery of hydrocyclone stages, the solution (A) and slurry (B) are preferably added on a different stage of the battery of hydrocyclone stages.

The current invention further relates to a process which is comprising a concentration step (=increase of dry matter) on at least one hydrocyclone stage. If said battery of hydrocyclone stages is containing a plurality of hydrocyclone stages, the process performed on said battery of hydrocyclone stages can comprise one or more concentration steps. This concentration further enriches the dry matter content of suspended particles (B'), and could reduce the amount of liquid in the collected slurry (B").

In addition, in the presence of a plurality of hydrocyclone stages in said hydrocyclone battery, the process can further comprise one or more clarification steps. This clarification contributes to reducing the amount of suspended particles (B') in the fraction which is not intended to be collected and which is called the waste water stream (A").

At most 10% by weight of the initial suspended particles (B') is collected in waste water stream (A"). Preferably at most 8% by weight, more preferably at most 7%, 5%, 4%, 3%, 2%, most preferably at most 1% by weight is collected in waste water stream (A").

The current invention further relates to a process characterized in that the dissolved particles (A') comprise one or more reagents, catalysts and/or reaction aids.

A reagent or reactant is a substance or compound consumed during a chemical reaction. Unlike other reagents that participate in the chemical reaction, a catalyst is not consumed, but is influencing the reaction rate of the reaction.

Reaction aids contribute to providing a suitable environment for a chemical or physical reaction. The latter engulfs substances, which alter pH and/or ionic strength of the medium, the stability and/or solubilization of the suspended particles (B) of the collected slurry (B"), or the reactivity of the reactants and/or products, without being restricted thereto. These substances may only alter the environment, or they may take part in a further reaction by forming an intermediate in a reaction step and being released in a later reaction step so that they are not or only partly consumed in a further reaction process.

Preferably the dissolved particles (A') comprise salts, more preferably selected from the group of alkali, earth alkali, iron, alumina salts and mixtures thereof. These salts can have as counter ion an ion selected from the group selected of chlorides, sulphates, sulphonates, phosphates and mixtures thereof.

E.g., in several modification reactions of starch, salts are conveniently used for stabilizing particular components of the slurry. These salts can be selected from alkali sulphates, alkaline earth sulphates, alkali phosphates, and the like, just to name a few possibilities without any limitation thereto.

In particular, an example for such a stabilizing effect of salt is the hydroxyalkylation of a starch substrate with propylene oxide in the production of hydroxypropylated starch. In this reaction, it is common practice in the art to use sulphate salts such as sodium sulphate as a reaction aid that is mixed with the starch slurry prior to the reaction. According to the prior art, hydroxypropylated starch is generally produced in a batch reaction with the sulphate salt being dosed into each reaction batch in crystalline form. After the hydroxypropylation reaction, the reaction liquid containing the sulphate salt is disposed to wastewater treatment and lost. This adds up to considerable costs for purchasing the salt, not to mention the treatment costs as it is often necessary to remove considerable amounts of the sulphate from the waste water before it could be released into the environment, e.g. by desulphurization using the expensive SulFerox™ and THIOPAQ® processes.

Alternatively, simply adding (=mixing into) the recuperated stream (solution (A)) containing the sodium sulphate as such to a slurry (B) will reduce the concentration of starch and consequently may have a negative effect on the efficiency of the further process.

According to the present invention, the total dry matter concentration of the collected slurry (B") is therefore adjusted by using at least one hydrocyclone stage or a disk or nozzle centrifuge. Preferably, a hydrocyclone stage is used.

The current invention further relates to a process comprising the following steps:
a. Taking a solution (A) of dissolved particles (A'),
b. Taking a slurry (B) of starch and/or starch derivatives (B'),
c. Providing solution (A) and slurry (B) onto different stages of a battery of hydrocyclone stages,
d. Collecting slurry (B") of starch and/or starch derivatives containing at least 10% weight of total weight of reaction aids (A') present in solution (A),
e. Collecting solution (A") containing max. 90% weight of total weight of reaction aids (A') present in solution (A).

At least 10% by weight of the initial dissolved reaction aids (A') present in initial solution (A) is recuperated into the collected slurry (B"). Preferably at least 20%, more preferably 30%, more preferably 35%, more preferably 40%, more preferably 45%, more preferably 50%, more preferably 52%, more preferably 55%, more preferably 56%, more preferably 58%, even more preferably up to 60%, 70% or even 80% by weight of initial dissolved reaction aids (A') is recuperated in collected slurry (B").

The dissolved particles can refer in a preferred embodiment to reaction aids which can be dissolved alkali sulphates, as mentioned before, but may comprise further other reaction aids such as glycol or other reaction products formed during reactions, an the like.

Solution (A"), which is called also the waste water stream, is containing maximum 90% by weight of total weight of reaction aids (A') initially being present in solution (A). Preferably solution (A") is containing less than 80%, more preferably 70%, more preferably 65%, more preferably 60%, more preferably 55%, more preferably 50%, more preferably 48%, more preferably 45%, more preferably 44%, more preferably 42%, even more preferably less than 40%, 30% or even not more than 20% by weight of initial dissolved reaction aids (A').

At least 90% by weight of the initial suspended starch and/or starch derivative particles (B') is collected in slurry (B"). Preferably at least 92% by weight, more preferably at least 93%, 95%, 96%, 97%, 98%, most preferably at least 99% by weight is collected in slurry (B").

The total dry matter concentration (expressed in weight per weight) of the suspensed starch and/or starch derivative particles (B) and the dissolved reaction aids (such as alkali sulphate and glycol and the like) (A') in slurry (B") is at least 3% based upon initial concentration, preferably at least 5%, more preferably at least 7%, more preferably at least 10%, more preferably 15%, most preferably 20%, even up to 50% higher than the dry matter concentration of the combined solution of reaction aids (A') and slurry of starch and/or starch derivative particles (B'). Slurry (B") is concentrated (=dry matter concentration is increased) in comparison to the combined dry matter concentration when simply mixing solution (A) and slurry (B).

The current invention further relates to a process wherein solution (A") is recycled into step a) and is used as sole solution (A) or is combined with any other solution (A) of dissolved reaction aids (A').

In a preferred embodiment, solution (A") is concentrated (increase of dry matter) by any conventional concentration method known to the person skilled in the art, before recycling into step a) of the process. In step a) the concentrated solution (A") may be applied as the sole solution of reaction aids or it may be combined with another solution (A) (freshly prepared or recuperated by any other means).

The current invention relates to a process characterized in that collected slurry (B") is applied in a starch modification process. The modification is an oxidation, acidification, esterification, etherification, crosslinking reaction, alkylation, hydroxyalkylation, hydrolyzation or a combination comprising one or more thereof, preferably a hydroxyalkylation, most preferably a hydroxyethylation or a hydroxypropylation.

In a preferred embodiment, the process is characterized in that solution (A) of dissolved reaction aids (A') is recuperated from a starch modification process.

Figure 2:
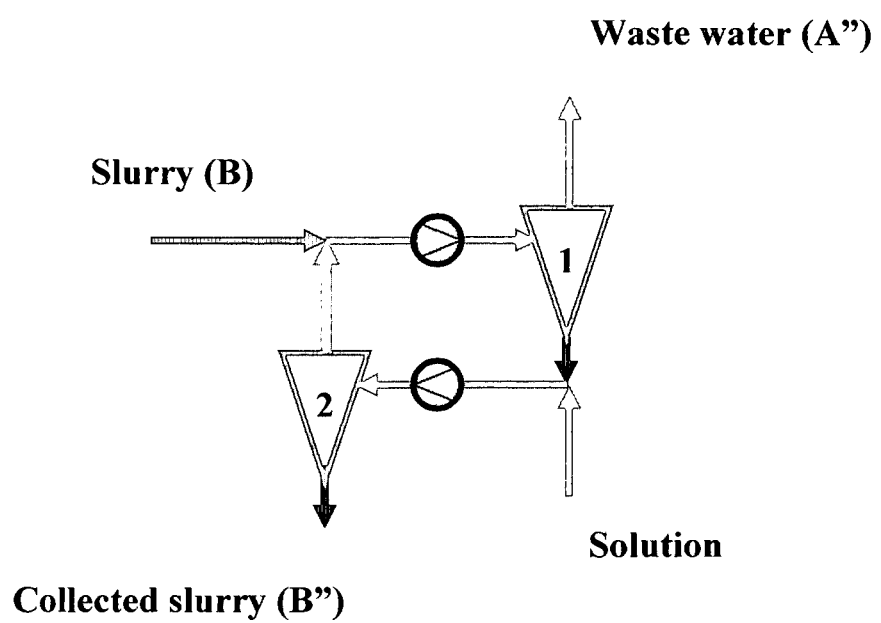
FIG. 2 represents a flow sheet of an example for a hydrocyclone equipment comprising two stages according to the present invention.
Figure 3:
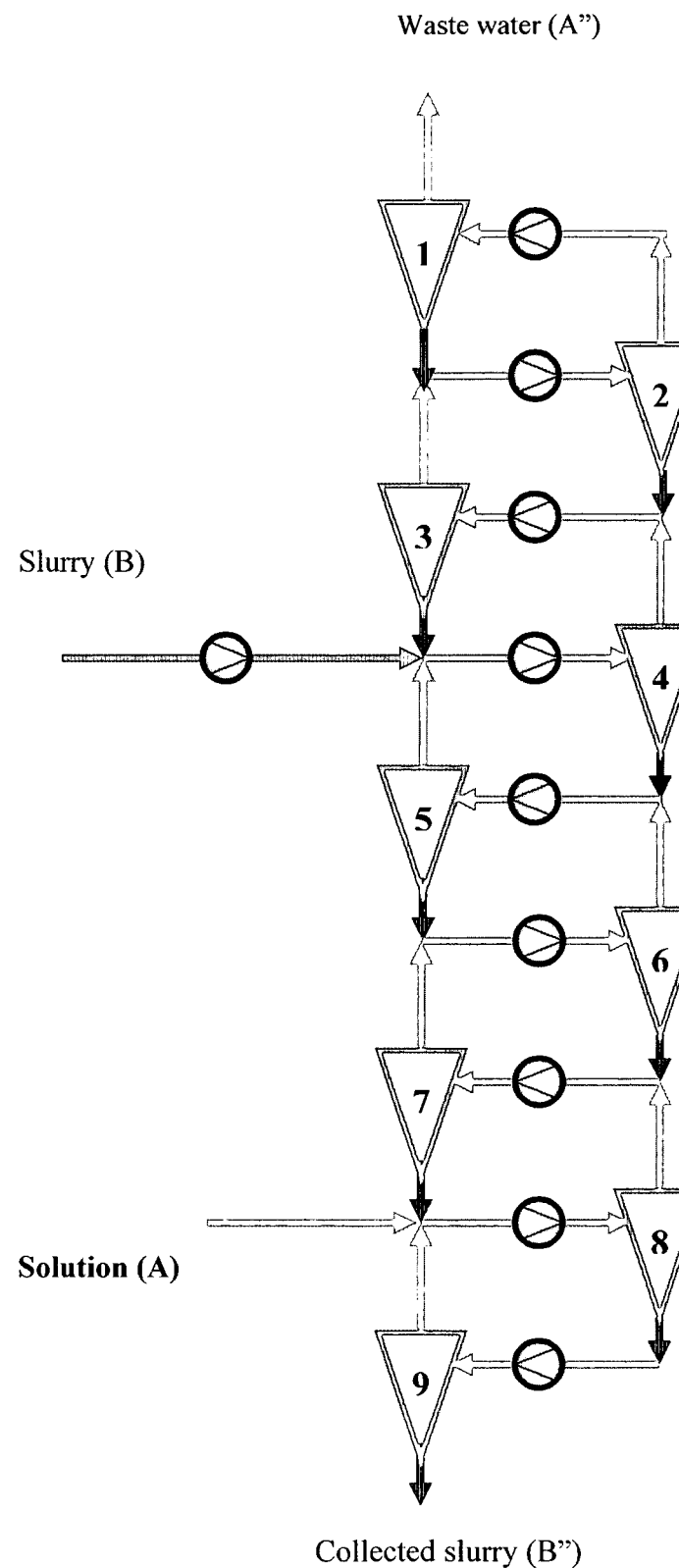
FIG. 3 represents a flow sheet of an example for a hydrocyclone equipment comprising nine stages according to the present invention.

An example for the flow of material in such a hydrocyclone battery using a countercurrent wash system is schematically shown in FIG. 1-3. In FIG. 3, a battery of nine hydrocyclone stages is shown. According to the countercurrent wash system, the overflow of one hydrocyclone which contains the lighter or more fluid fraction is fed to the hydrocyclone denoted by the next lower number, and the underflow containing the thicker or denser fraction is fed to the hydrocyclone stage denoted by the next higher number. The slurry (B) is fed into the fourth hydrocyclone stage in this example, while a solution (A) is fed into the eighth hydrocyclone stage. The final collected slurry (B") is obtained as the underflow of the ninth hydrocyclone in the battery. However, if the desired components are enriched in the less dense fraction, the overflow of the first hydrocyclone could also be collected.

Furthermore the current invention has potentially additional advantages such as described below but is not at all limited to these.

Adjusting the concentration of the particles of the collected slurry on a hydrocyclone unit or a disk or nozzle centrifuge further enables performing the preparation of a slurry as a continuous process. This would allow for feeding various batch reactions at staggered intervals or for continuously feeding a continuous reaction of the slurry.

Depending on the type of the collected slurry (B"), the concentration adjustment can further be supported by performing the process at a particular temperature. E.g., the process could be performed at elevated temperatures. These elevated temperatures could be obtained by any possible method known in the art, such as pre-heating the feed supply. Alternatively or in additional, the material can also be heated up due to energy input during operation of a hydrocyclone equipment or a disk or nozzle centrifuge, although this increase in temperature could be regulated by further heating or cooling of the apparatus, if desired. For some reactions, it was found, that a particularly well-suited increase of the concentration could be reached at temperatures above 30° C., such as between 40 and 60° C. or 50 to 55° C.

According to a particularly preferred embodiment of the present invention, the process uses a solution (A) wherein said solution is recovered from a previous reaction. This solution being recovered from a previous reaction could derive from any kind of reaction which allows for the recovery of useful particles for the reaction slurry. However, it is particularly preferred to recover the solution from a previous reaction of the same kind, e.g. from a previous hydroxyalkylation reaction of a starch substrate for a new hydroxyalkylation of another batch of starch substrate. Components such as catalysts, reagents, and/or reaction aids, which are not consumed during the reaction and which are soluble, could easily be recovered from a reaction such as the modification of starch by separating the products of the reaction. E.g., if the desired product of the reaction is a modified starch product which is not soluble in the reaction liquid, it can easily be separated by a filtration and/or a centrifugation step. The non-consumed soluble components remain solubilized in the filtrate or centrifugation supernatant and can thus be channelled towards re-use for preparing a new collected slurry (B") for the modification of a new batch of starch substrate by introducing the solution into the hydrocyclone equipment, or the disk or nozzle centrifuge.

Such a procedure also reduces the amount of waste or wastewater produced in the reaction. The dissolved particles in the medium after the reaction do not have to be disposed into the environment or separated from the waste using expensive purification processes to reduce the concentration in the waste, but they can be re-used in further reactions.

The current invention further relates to a process wherein the collected slurry (B") is applied as finished product. In certain applications it might be useful to have a starch and/or starch derivative slurry which is containing dissolved reaction aids, catalysts and/or reagents, preferably salts. Suitable applications can be foreseen in paper industry, and any other type of industry where it is preferred to have a salt containing starch-based slurry. The slurry (B") when applied as finished product may be concentrated (=increase of dry matter content), eventually up to full dryness (less than 5% moisture content) before use.

Finally, the current invention relates to the use of at least one hydrocyclone stage or hydrocyclone battery for combining the dry matter of two streams into a single stream having a total dry matter concentration that is higher than the dry matter concentration of the combined streams.

Furthermore it relates to the use of at least one hydrocyclone stage or hydrocyclone battery for combining the dry matter of two streams characterized in that one stream is a solution (A) of dissolved particles (A'), and another stream is a slurry (B) of suspended particles (B').

In order to have an effective process, the total dry matter concentration (expressed in weight per weight) of the suspended particles (B) and the dissolved particles (A') in slurry (B") is at least 3% based upon initial concentration, preferably at least 5%, more preferably at least 7%, more preferably at least 10%, more preferably 15%, most preferably 20%, even up to 50% higher than the dry matter concentration of the combined solution (A) and slurry (B). Slurry (B") is concentrated (=dry matter concentration is increased) in comparison to the combined dry matter concentration when simply mixing solution (A) and slurry (B).

In a particular embodiment of the present invention, the collected slurry is a slurry of starch and/or starch derivative.

The process according to the present invention is now explained in further detail by referring to examples of hydroxypropylation of starch. It is understood that these examples are for illustrative purpose only and are not intended to limit the scope of the present invention in any way.

EXAMPLES

The examples below are performed with a waxy corn starch slurry on a hydrocyclone battery containing 7 to 9 stages, using a countercurrent wash system. The starch slurry (B) was supplied to the hydrocyclone battery on stage 4. The solution (A) containing dissolved particles was introduced on stage 7, or 8. A flow sheet of the hydrocyclone unit is provided in FIG. 3 showing a 9 stage system wherein the solution is introduced on stage 8.

Analysis:

Measurement of dry matter content of starch slurry through Baume weighing was performed according to standard method NEN 3090:1982nl Measurement of moisture content of starch slurry was performed according to standard method NEN 1666:1997 EN Sodium measurement (or potassium, magnesium) was performed according to standard method NEN 6869.

Example 1

A hydrocyclone battery according to FIG. 3 was used. The solution (A) was an overflow of a starch wash battery from a previous batch of hydroxypropylation of starch. The further process data were as follows:

Hydrocyclone configuration (Dorr Oliver, having an internal diameter of 10 mm): each of these figures describes the number of hydrocyclones present per stage: e.g. stage 1 contains 7 hydrocyclones, stage 2 contained 10 hydrocyclones, etc.: 7,10,12,12,8,8,10,6

| | |
|---|---|
| Number of stages | 9 |
| Slurry (B) Supply stage | 4 |
| Solution (A) stage | 9 (no concentration stage involved) |
| Slurry (B) feed flow | 900 l/h |
| Starch in slurry (B) | 360 g/kg |
| Solution (A) feed flow | 880 l/h |
| Underflow (B") | 982 l/h |
| Starch in underflow | 32.43% = 98.7% recuperation |
| Sodium sulphate in solution (A) feed | 44400 mg/kg |
| Sodium sulphate in underflow (B") | 23482 mg/kg = 66.5% recuperation |

With this example we were able to show:
1. the hydrocyclone system is able to produce a sulphate rich starch slurry (B");
2. By mixing the solution and the slurry, the final starch concentration was 19.2% and the sodium sulphate was 20700 mg/kg.

Example 2

In this example the solution feed was introduced stage 7 and with a total number of 9 stages, 2 concentration stages were used. In addition, the slurry feed and the sodium sulphate containing solution feed were fed at elevated temperatures, which lead together with the energy input from the hydrocyclone operation to an underflow temperature of 55° C.

| | |
|---|---|
| Number of stages | 9 |
| Supply stage | 4 |
| Wash water stage | 7 |

Hydrocyclone configuration: 7,10,12,12,8,8,10,6

| | |
|---|---|
| Slurry (B) feed flow | 850 l/h |
| Starch in slurry (B) | 360 g/kg |
| Solution (A) feed flow | 900 l/h |
| Underflow (B") | 838 l/h |
| Slurry feed temperature | 38° C. |
| Solution feed temperature | 43° C. |
| Underflow temperature | 55° C. |
| Underflow density | 1164 g/l |
| Starch in underflow (B") | 35.39% = 97.7% recuperation |
| Sodium sulphate in solution (A) feed | 44400 mg/kg |
| Sodium sulphate in underflow (B") | 22680 mg/kg = 53.4% recuperation. |

By using a concentration stage after the wash stage, an increased starch concentration can be obtained.

By mixing the solution and the slurry, the final starch concentration was 18.4% and the sodium sulphate was 21600 mg/kg.

The invention claimed is:
1. A process for preparation of slurries containing suspended and dissolved particles, said process comprising the following steps:
   a. providing a solution (A) of dissolved particles (A'),
   b. providing a slurry (B) of suspended particles (B'),
   c. introducing solution (A) and slurry (B) into a battery of hydrocyclone stages containing at least two hydrocyclone stages, wherein the solution (A) and the slurry (B) are separately introduced at different stages of the battery of hydrocyclone stages; and d. collecting a slurry (B") containing at least a part of dissolved particles (A') and at least a part of suspended particles (B');

wherein the collected slurry (B") has a total dry matter concentration of the suspended particles (B') and dissolved particles (A') that is at least 3% higher than the combined dry matter concentration of solution (A) and slurry (B).

2. The process according to claim 1, wherein the slurry (B) is a slurry of starch and/or starch derivatives.

3. The process according to claim 1, wherein the dissolved particles (A') comprise one or more catalysts, reagents and/or reaction aids.

4. The process according to claim 1, wherein the dissolved particles (A') comprise salts.

5. The process according to claim 1, wherein the suspended particles are selected from the group consisting of native starches or modified starches selected from the group consisting of crosslinked starches, acetylated starches, hydroxyethylated and hydroxypropylated starches, inorganically esterified starches, oxidized starches, zwitterionic starches, starches modified by enzymes, and combinations thereof.

6. The process according to claim 1, wherein the battery of hydrocyclone stages comprises a number of hydrocyclone stages selected from the group consisting of six hydrocyclone stages, seven hydrocyclone stages, eight hydrocyclone stages, nine hydrocyclone stages, ten hydrocyclone stages, eleven hydrocyclone stages and twelve hydrocyclone stages.

7. The process according to claim 6, wherein the solution (A) is introduced at the penultimate stage of the battery of hydrocyclone stages and the slurry (B) is introduced at approximately the middle stage of the battery of hydrocyclone stages.

8. A process for preparation of slurries containing suspended and dissolved particles, said process comprising the following steps:

a. providing a solution (A) of dissolved reaction aids (A');
b. providing a slurry (B) of starch and/or starch derivatives (B');
c. introducing solution (A) and slurry (B) into a battery of hydrocyclone stages containing at least two hydrocyclone stages, wherein the solution (A) and the slurry (B) are separately introduced at different stages of the battery of hydrocyclone stages; and
d. collecting slurry (B") of starch and/or starch derivatives containing at least 10% weight of total weight of dissolved reaction aids (A') present in solution (A);
e. collecting solution (A") containing a maximum of 90% weight of total weight of dissolved reaction aids (A') present in solution (A);

wherein the collected slurry (B") has a total dry matter concentration of the starch and/or starch derivatives (B') and dissolved reaction aids (A') that is at least 3% higher than the combined dry matter concentration of solution (A) and slurry (B).

9. The process according to claim 8, wherein the collected slurry (B") contains at least 90% by weight of the initial starch and/or starch derivatives (B').

10. The process according to claim 8, wherein solution (A") is recycled into step (a) as a component of solution (A).

11. The process according to claim 8, wherein solution (A") is concentrated to a higher dry matter concentration of dissolved reaction aids (A'), and recycled into step (a) as a component of solution A.

12. The process according to claim 8, wherein slurry (B") is applied in a starch modification process.

13. The process according to claim 12, wherein the starch modification process is an oxidation, acidification, esterification, etherification, crosslinking reaction, alkylation, hydroxyalkylation, hydrolyzation or a combination thereof.

14. The process according to claim 8, wherein solution (A) of dissolved reaction aids (A') is recuperated from a starch modification process.

15. The process according to claim 8, wherein the starch and/or starch derivatives are selected from the group consisting of native starches or modified starches selected from the group consisting of crosslinked starches, acetylated starches, hydroxyethylated and hydroxypropylated starches, inorganically esterified starches, oxidized starches, zwitterionic starches, starches modified by enzymes, and combinations thereof.

16. The process according to claim 8, wherein the battery of hydrocyclone stages comprises a number of hydrocyclone stages selected from the group consisting of six hydrocyclone stages, seven hydrocyclone stages, eight hydrocyclone stages, nine hydrocyclone stages, ten hydrocyclone stages, eleven hydrocyclone stages and twelve hydrocyclone stages.

17. The process according to claim 16, wherein the solution (A) is introduced at the penultimate stage of the battery of hydrocyclone stages and the slurry (B) is introduced at the middle stage of the battery of hydrocyclone stages.

* * * * *